United States Patent [19]

Inoue

[11] Patent Number: 4,993,863
[45] Date of Patent: Feb. 19, 1991

[54] JOINT DEVICE
[75] Inventor: Yoichi Inoue, Kiryu, Japan
[73] Assignee: Mitsuba Electric Mfg. Co., Ltd., Gunma, Japan
[21] Appl. No.: 416,012
[22] Filed: Oct. 2, 1989

Related U.S. Application Data
[63] Continuation of Ser. No. 188,277, Apr. 29, 1988, abandoned.

[51] Int. Cl.⁵ .............................................. F16C 11/06
[52] U.S. Cl. ...................................... 403/133; 403/71
[58] Field of Search ................ 403/133, 71, 141, 132, 403/122

[56] References Cited

U.S. PATENT DOCUMENTS

| | | | |
|---|---|---|---|
| 2,829,904 | 4/1958 | Walter | 403/141 X |
| 2,876,029 | 3/1959 | Latzen | 403/133 |
| 3,787,127 | 1/1974 | Cutler | 403/133 |
| 3,853,414 | 12/1974 | Hirano et al. | 403/122 X |
| 3,861,812 | 1/1975 | Ito | 403/71 |
| 4,235,558 | 11/1980 | Snyder et al. | 403/133 X |
| 4,260,275 | 4/1981 | Chevallier | 403/133 |
| 4,318,627 | 3/1982 | Morin | 403/133 |
| 4,410,295 | 10/1983 | Ersoy et al. | 403/133 X |
| 4,714,368 | 12/1987 | Sawada et al. | 403/133 X |

FOREIGN PATENT DOCUMENTS

| | | | |
|---|---|---|---|
| 696869 | 1/1931 | France | 403/133 |
| 718968 | 11/1954 | United Kingdom | 403/122 |

Primary Examiner—José V. Chen
Attorney, Agent, or Firm—Rodman & Rodman

[57] ABSTRACT

A joint device wherein spherical shaft is pressed into and coupled with a spherical bearing member made of resin through an opening formed in a portion of a spherical bearing portion a generally cylindrical skirt portion is formed at the opening of the spherical bearing member such that the minimum inside diameter of the skirt portion is smaller than the inside diameter of the opening, and a flex starting portion is formed at a position close to the skirt portion of the spherical bearing portion. The inner peripheral surface of the skirt portion is tapered inwardly in a direction away from the spherical bearing portion. An inwardly raised portion is provided at a portion of the inner peripheral surface of the skirt portion.

4 Claims, 3 Drawing Sheets

JOINT DEVICE

This is a continuation of application Ser. No. 188,277, filed Apr. 29, 1988 now abandoned.

BACKGROUND OF THE INVENTION

1. Field of the Invention

This invention relates to a joint device, more particularly to a joint device, wherein a spherical shaft is coupled into a spherical bearing member made of resin, and is concerned with a spherical shaft effectively used in a connecting rod for use in a link device of a wiper system in a motor vehicle for example.

2. Statement of the Related Art

In general, in a wiper system for wiping a window glass of a motor vehicle, a link device is used to convert rotary motion of the wiper motor into rocking motion of a wiper arm. In the link device of this type, spherical bearing members are joint members made of resin and are integrally formed (hereinafter referred to as "outsert molded") at opposite end portions of a rod. There may also be used a connecting rod, in which a spherical shaft as being a counterpart joint member is coupled into this spherical bearing member.

In the connecting rod of this type, a spherical shaft is pressed into and coupled with a spherical bearing portion through an opening formed by cutting open a portion of the spherical bearing portion in a spherical bearing member.

It is desirable to readily press the spherical shaft into the spherical bearing member in the joint device of this type. However, if the spherical bearing member is designed so that spherical shaft can be pressed into it by weak force, the spherical shaft tends to slip out of the spherical bearing portion after being assembled.

SUMMARY OF THE INVENTION

An object of the present invention is to provide a joint device wherein a spherical shaft can be readily coupled into a spherical bearing member while the spherical shaft is prevented from easily slipping out of the spherical bearing member.

A joint device according to the present invention features that, in a joint device wherein a spherical shaft is pressed into and coupled with a spherical bearing member made of resin through an opening formed in a portion of a spherical bearing portion, a generally cylindrical skirt portion is formed at the opening of the spherical bearing member such that the minimum inside diameter thereof is smaller than the inside diameter of the opening, and a flex starting portion is formed at a position close to the skirt portion of the spherical bearing portion.

When the spherical shaft is assembled to the spherical bearing member, a spherical portion of the spherical shaft is inserted into a lower end opening of the skirt portion, and thereafter, pressed in. As the spherical portion is pressed into the skirt portion, the skirt portion is spread out like an unfolded fan. However, since the flex starting portion is provided at about a base end of the skirt portion of the spherical bearing member, deformation of this spread occurs around the flex starting portion. Since the inner peripheral surface of the skirt portion is tapered off, the spherical portion comes into pressing contact with the inner peripheral surface of the forward end of the skirt portion, whereby a force for spreading out the skirt portion, which occurs due to press-in of the spherical portion, acts on the forward end. In short, since the distance from this point of application to the flex starting portion is relatively large, the force necessary for pressing and spreading out the skirt portion can be relatively small. Accordingly, a press-in force applied to the spherical shaft, which is necessary for producing this pressing and spreading force, can be small.

When the largest outside diameter portion of the spherical portion reaches the opening, an angle of inclination of the inner peripheral surface of the skirt portion to a tangent at a contact point with the spherical portion becomes small because the inner spherical surface of the skirt portion is tapered off. This angle of inclination corresponds to an angle of friction when the spherical portion is coupled into the opening. Since this angle is small, the spherical portion can be pressed into the opening by a small press-in force.

When the largest outside diameter portion of the spherical portion goes beyond the opening, as the diameter of a main body of the spherical bearing member decreases through the agency of a restoring force, a force to drag in the spherical portion is applied by the spherical bearing portion, whereby the spherical portion is smoothly coupled into the spherical bearing portion so as to be supported in a manner to be rotatable in three dimensional directions.

As described above, according to the aforesaid means, the press-in force applied to the spherical shaft can be controlled to be small at the time of coupling the spherical shaft into the spherical bearing member, so that the assembly can be facilitated. When, the press-in force applied is set to be equal to the conventional press-in force, a resistant force of the spherical bearing member at the time of an increased diameter can be set at a higher value in comparison with the press-in force, so that, a resistant force against slip-out of the spherical shaft from the spherical bearing member can be set at a relatively higher value after the connection of the spherical bearing member to the spherical shaft.

BRIEF DESCRIPTION OF THE DRAWINGS

The above and other objects and features of the present invention will become more apparent when referred to the following descriptions given in conjunction with the accompanying drawings, wherein like reference numerals denote like elements, and in which.

DETAILED DESCRIPTION OF THE PREFERRED EMBODIMENTS

Figure 1:
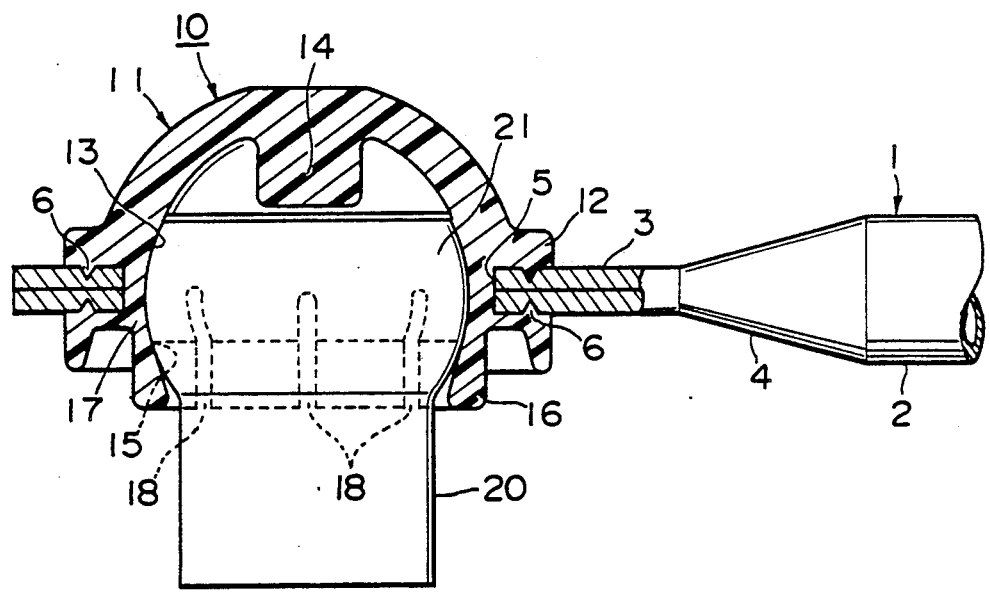
FIG. 1 is an enlarged, partial, longitudinal sectional view showing a connecting rod embodying the present invention.
Figure 2:
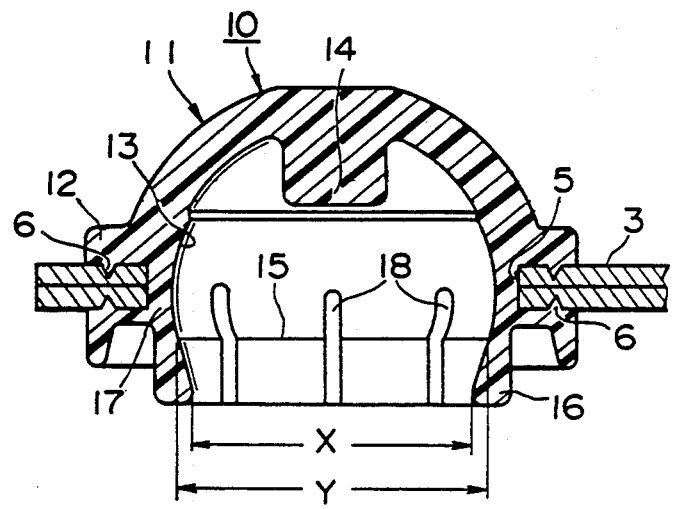
FIG. 2 is an enlarged, partial, longitudinal sectional view showing a spherical bearing member thereof.

Referring to the drawings, in this embodiment, a connecting rod as a joint device includes: a rod; a spherical bearing member as a joint member, made of resin and outsert molded in a manner to be center-aligned with a mounting hole formed at opposite ends of the rod; and a spherical shaft pressed into the spherical bearing member. The rod 1 outsert molded at the opposite ends thereof with the spherical bearing members is constructed such that a round pipe is previously, integrally formed by press work into such a form as shown in FIG. 1 (only partially shown). The rod 1 is generally formed into a pipe form, and formed at opposite ends thereof (only one end is shown) with mounting portions 3, each of which is flattened into an oval shape having a width broader than the width of the pipe-shaped portion and outsert molded thereto with each of the spherical bearing members. A connecting portion 4 for connecting the pipe-shaped portion 2 to the flat plate-shaped mounting portion 3 in the rod 1 in such a manner that the difference in shape therebetween is well-matched or absorbed is formed into a continuously changing form, with the height thereof being progressively reduced from the pipe-shaped portion 2 the mounting portion 3 and the width thereof being progressively increased. The mounting portion 3 of the rod 1 is concentrically formed with a mounting hole 5, which is outsert molded thereto with the spherical bearing member. This mounting hole 5 can perform a function as a portion to be positioned during outsert molding. The mounting portion 3 is provided on the front and rear surfaces thereof with pairs of V-shaped grooves 6, which are concentrically formed in circularly arcuate shapes at positions close to the mounting hole 5.

A spherical bearing member 10 is outsert molded on the mounting portion 3 of the rod 1 by use of a suitable resin in a manner to be center-aligned with the mounting hole 5, and provided with a main body 11 formed into a generally inverted bowl shape. The main body 11 of the spherical bearing member 10 is integrally connected at a flange portion 12 formed on the outer periphery thereof to the inner peripheral portion of the mounting hole 5 of the rod mounting portion 3. In this manner, the grooves 6 are filled with a resinous portion in the flange portion 12, so that connection can be improved and rotation-locking can be provided. A spherical bearing portion 13 is formed in the main body 11 in a manner to be slightly larger than a hemispherical hollow body, and the spherical bearing body is coupled thereinto with a spherical shaft to be described hereunder, to rotatably support the same in three dimensional directions. Provided on a surface of the ceiling of the hollow portion of the main body 11 is a protruding portion 14, which is arranged on the center line of the mounting hole 5 and protruding downwardly, so that the protruding portion 14 can prevent the spherical shaft from being excessively displaced.

The main body 11 is formed with an opening 15 in such a manner that a lower portion of the spherical hollow portion of the spherical bearing portion 13 is cut away in parallel to the mounting hole 5. A generally cylindrical skirt portion 16. The inner peripheral surface of this skirt portion 16 is tapered inwardly in a direction away from the opening 15, to provide a minimum inside diameter X that is smaller than an inside diameter Y of the opening 15.

Furthermore, in the main body of the spherical bearing member 11, a flex starting portion 17 is provided at about the opening 15 of the spherical bearing portion 13, at which the wall thickness of the spherical bearing portion 13 is relatively thin. When the spherical shaft to be described hereunder is coupled into the spherical bearing portion 13, this flex starting portion 17 is adapted to flex as a starting portion for the spread of the skirt portion 16 and the opening 15. Further, a plurality of slits 18 are cut at regular intervals in the circumferential direction along a portion extending from the central portion of the spherical bearing portion 13 to the skirt portion 16. These slits 18 are spread in the circumferential direction when a spherical shaft is coupled into the spherical bearing portion 13.

A spherical shaft 20 having into a generally columnar shape, is integrally formed at one end portion with a spherical portion 21. The spherical portion 21 is formed of a spherical body with the upper and lower portions thereof being cut away and coupled into and supported by the spherical bearing portion 13 of the spherical bearing member 10.

Description will hereunder be given of actions of respective components during assembly of the spherical shaft 20 to the spherical bearing member 10 in the above-described arrangement.

Figure 3:
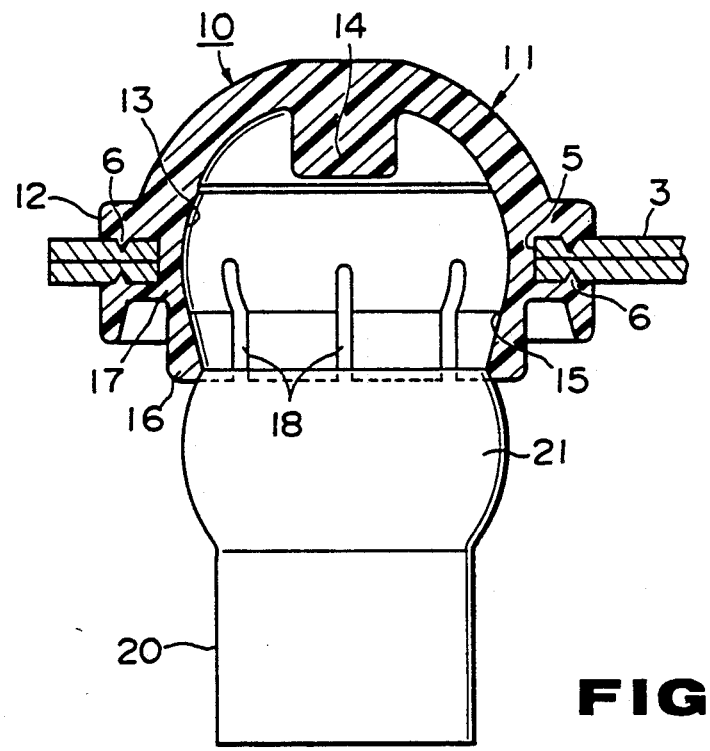
FIGS. 3, 4 and 5 are enlarged, partial, longitudinal sectional views showing steps of assembly thereof.

When the spherical shaft 20 is assembled to the spherical bearing member 10 outsert molded on the mounting portion 3 of the rod 1 in a manner to be center-aligned with the mounting hole 5, as shown in FIG. 3, the spherical portion 21 of the spherical shaft 20 is inserted into a bottom end opening of the skirt portion 16, and thereafter, pressed in.

Figure 4:
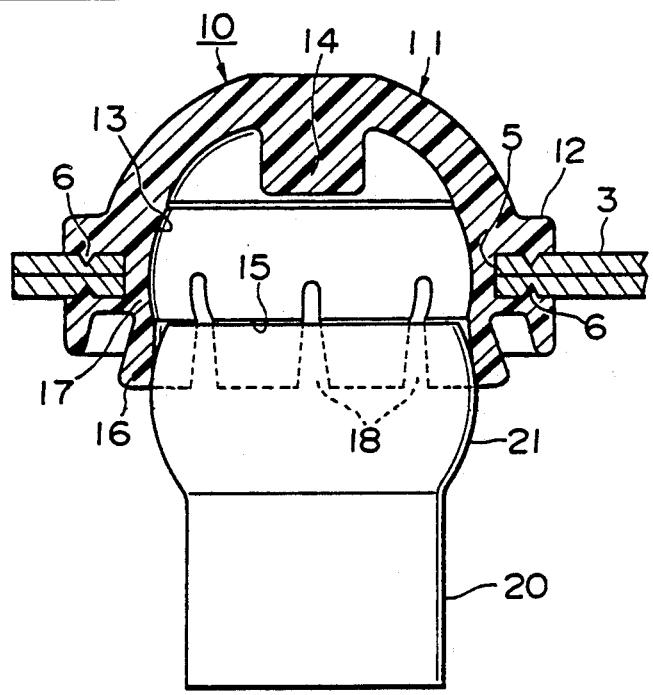

As shown in FIG. 4, the spherical portion 21 is pressed into the skirt portion 16, whereby the skirt portion 16 is spread out like an unfolded fan. However, on the spherical bearing member 10, the flex starting portion 17 is provided at about the base end of the skirt portion 16, so that deformation of this spread is centered around the flex starting portion 17. Since the inner peripheral surface of the skirt portion 16 is inwardly tapered, the spherical portion 21 comes into pressing contact with the inner peripheral surface of the forward end of the skirt portion 16, whereby a force for spreading out the skirt portion 16 acts on the forward end. In short, since a distance from this point of force application to the flex starting portion 17 is relatively large, the force necessary for pressing and spreading out the skirt portion 16 can be relatively small. Accordingly, a press-in force applied to the spherical shaft 20, which is necessary for producing this pressing and spreading force can be relatively small.

Figure 5:
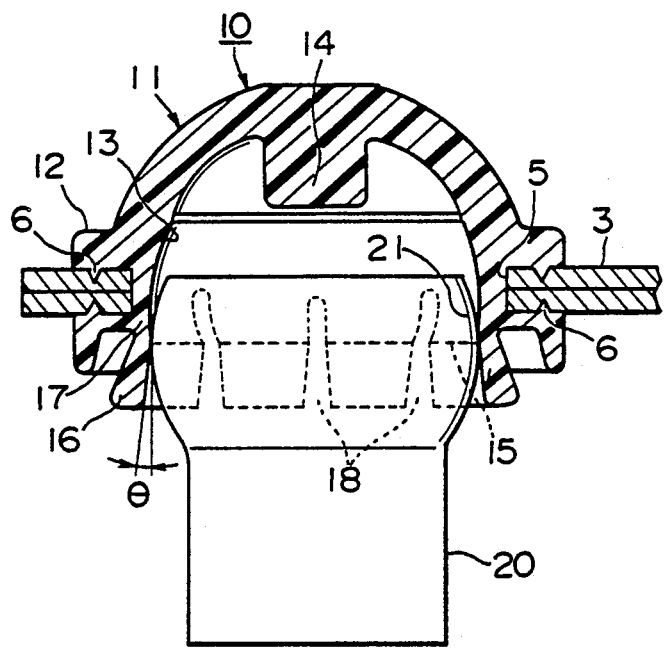

As shown in FIG. 5, when the largest outside diameter of the spherical portion 21 reaches the opening 15, an angle of inclination $\theta$ of the inner peripheral surface of the skirt portion 16 to a tangent at a contact point with the spherical portion 21 becomes small because the inner spherical surface of the skirt portion 16 is tapered off. This angle of inclination 8 corresponds to an angle of friction when the spherical portion 21 is coupled into the opening 15. Since this angle is small, the spherical portion 21 can be pressed into the opening 15 by a small press-in force.

Here, as the spherical portion 21 is pressed into the skirt portion 16 and the opening 15, the group of slits 18 are opened in a manner to spread the widths out, whereby the skirt portion 16 and the opening 15 are aided in their spread-out, so that the press-in force applied to the spherical shaft 20 can be reduced accordingly.

When the largest outside diameter portion of the spherical portion 21 of the spherical shaft 20 goes beyond the opening 15,, as the diameter of a main body 11 of the spherical bearing member decreases through the agency of a restoring force, a force to drag in the spherical portion 21 is applied by the spherical bearing portion 13, whereby the spherical portion 21 is smoothly coupled into the spherical bearing portion 13 to be supported in a manner to be rotatable in three dimensional directions.

As described above, according to this embodiment, the press-in force applied to the spherical shaft 20 can be controlled to be relatively small at the time of coupling the spherical shaft 20 into the spherical bearing member 10, so that the assembly can be facilitated. When the press-in force applied is made to be equal to the conventional press-in force, a resistant force of the spherical bearing member 10 at the time of the increased diameter can be set at a higher value, so that, a resistant force against slip-out of the spherical shaft 20 from the spherical bearing member 10 can be set at a relatively higher value after the connection of the spherical bearing member 10 to the spherical shaft 20.

Allocation between the effect of improvement of the assembly and the effect of slip-out prevention can be desirably set by suitably selecting the shapes, sizes and the like of the skirt portion and the flex starting portion.

Incidentally, the present invention need not necessarily be limited to the above embodiment, and, needless to say that various modifications can be adopted within a scope of not departing from the gist of the present invention.

For example, the inner peripheral surface of the skirt portion 16 need not necessarily be limited to the rectilinear surface, and may be formed into a convex or concave curved surface.

Figure 6:
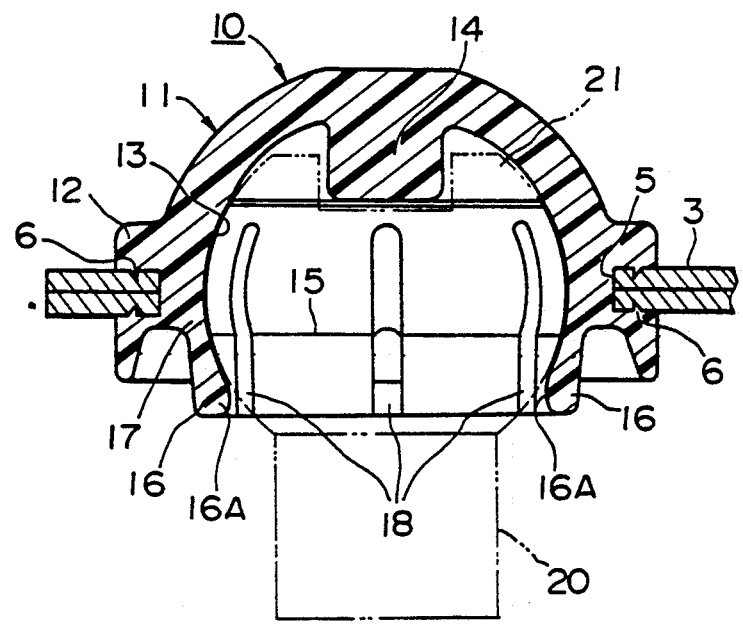
FIG. 6 is an enlarged, partial, longitudinal sectional view showing another embodiment of the present invention.

Furthermore, as shown in FIG. 6, an inwardly raised portion 16A may be provided at least at a portion of the inner peripheral surface of the skirt portion 16. Owing to this raised portion 16A, the skirt portion 16 is spread out more widely at the time of pressing in the spherical portion 21, so that press-in of the spherical shaft 20 can be easier, while, a resistant force to prevent the spherical shaft 20 from slipping out of the spherical bearing member 10 can be increased after the connection of the spherical shaft 20 to the spherical bearing member 10.

The minimum inside diameter of the skirt portion need not necessarily be provided at the opening for insertion, and may be provided halfway between the opening for insertion of the skirt portion and the opening of the spherical bearing portion.

In the above embodiment, description has been given to the manufacture of the connecting rod for use in the link device. However, the joint device according to the present invention is applicable to the whole of the joint devices such as the connecting rod in a retractor device, a link bar in the link device and so forth.

ADVANTAGES OF THE INVENTION

As has been described hereinabove, according to the present invention, such an arrangement can be adopted that the spherical shaft can be readily coupled into the spherical bearing member while the spherical shaft is prevented from easily slipping out of the spherical bearing member, and, the spherical bearing member's force for holding the spherical shaft is increased in comparison with the press-in force of the spherical shaft.

What is claimed is:

1. A joint device comprising a spherical shaft having a free end with a spherical portion, said spherical portion having a first spherical diameter, a spherical bearing member made of resin, spherical bearing member including a spherical bearing portion for accommodating the spherical portion of said shaft, said spherical bearing portion having one and only one spherical bearing portion opening for receiving passage of said spherical shaft, said spherical bearing portion opening having a periphery and a first inner diameter of lesser magnitude than the first spherical diameter of said spherical portion, a generally annular skirt portion formed at the periphery of said spherical bearing portion opening and being annular about a central axis and extending axially away from said spherical bearing portion opening a predetermined amount and having a free open end portion, said skirt portion having a normal unexpanded condition with a minimum inner diameter of lesser magnitude than the first inner diameter of said spherical bearing portion opening, said minimum inner diameter being located a predetermined axial distance away from the first inner diameter of said spherical bearing portion such that said minimum inner diameter limits withdrawal of said spherical portion from said spherical bearing member when said spherical portion is coupled in said spherical bearing member, a flex starting portion formed in said spherical bearing portion axially inwardly of said spherical bearing portion opening, said skirt portion having a plurality of slits formed therein and extending axially inwardly from said free open end portion to at least said flex starting portion to define segments of said skirt portion spaced by said slits, and the skirt portion at said minimum inner diameter is radially deflectable away from said central axis about said flex starting portion to expand said minimum inner diameter a predetermined amount at said segments sufficient to accommodate said spherical shaft, said spherical shaft being coupled with said spherical bearing member by insertion of the free end of said spherical shaft into the free open end portion of said skirt such that the spherical portion of said shaft engages the minimum inner diameter portion of said skirt to cause the segments of said skirt to expand at said slits and to flex about said flex starting portion such that said flexion causes said first inner diameter of said spherical bearing portion to radially expand about said flex starting portion to permit reception of said spherical bearing portion through the spherical bearing member opening such that the free end of the spherical shaft with the spherical portion is the first part of the spherical shaft to pass through the spherical bearing portion opening, and wherein said skirt portion contracts to its normal unexpanded condition after said spherical portion is coupled into said spherical bearing member, the contraction of said skirt portion after coupling of said spherical shaft with said spherical bearing member enabling the minimum inner diameter to limit withdrawal of said spherical shaft from said spherical bearing member.

2. A joint device according to claim 1 wherein said skirt portion has an inner surface tapered along said central axis such that said inner surface has a diametrical magnitude that decreases to said minimum inner diameter in an axial direction from the first inner diameter of said spherical bearing portion opening to said free open end portion of said skirt portion to limit withdrawal of said spherical shaft from said spherical bearing member.

3. A joint device according to claim 1 wherein said skirt portion has an inner surface, and said inner surface projects toward said central axis a predetermined amount to define said minimum diameter, to limit withdrawal of said spherical shaft from said spherical bearing member.

4. A joint device according to claim 1, wherein a connecting rod is joined to said spherical bearing member and is free from engagement with said skirt portion.

* * * * *